United States Patent [19]
Nasu

[11] Patent Number: 5,797,573
[45] Date of Patent: Aug. 25, 1998

[54] NON-PENETRATION CLIP ATTACHMENT

[75] Inventor: Keyle H. Nasu, Bellevue, Wash.

[73] Assignee: The Boeing Company, Seattle, Wash.

[21] Appl. No.: 805,798

[22] Filed: Feb. 25, 1997

Related U.S. Application Data

[63] Continuation of Ser. No. 373,135, Jan. 12, 1995, abandoned.
[51] Int. Cl.⁶ .................................................. A47B 96/06
[52] U.S. Cl. .................. 248/231.31; 248/228.2; 248/316.2
[58] Field of Search ............... 248/231.31, 316.2, 248/231.44, 316.4, 228.2, 229.11, 229.21

[56] References Cited

U.S. PATENT DOCUMENTS

| | | | |
|---|---|---|---|
| 2,329,894 | 2/1943 | Hall | 24/81 |
| 2,346,200 | 3/1944 | Tinnerman | 85/36 |
| 2,709,571 | 9/1955 | Aligner | 248/188.5 |
| 2,819,037 | 10/1958 | Wilkin | 249/188.2 |
| 3,306,562 | 2/1967 | Bellefleur | 248/188.2 |
| 4,595,163 | 6/1986 | Guggiari | 248/316.4 |
| 5,292,102 | 3/1994 | Hoover | 248/231.41 |
| 5,352,078 | 10/1994 | Nasu | 411/337 |

*Primary Examiner*—Ramon O. Ramirez
*Assistant Examiner*—Gwendolyn W. Baxter
*Attorney, Agent, or Firm*—Bernard A. Donahue

[57] ABSTRACT

A molded clip for attaching wire bundles and the like to aircraft stringers is described. The clip has two major parts, each of which has a matching 45° inclined surface. When a vertically aligned bolt that connects the two parts is tightened, the bottom portion of the clip slides upwardly along the matching 45° inclined surface of the top portion of the clip. This movement causes gripping surfaces of the top and bottom portions to engage and secure the clip to a stringer flange. An upstanding boss having a metallic threaded insert for receiving another bolt is used to secure the wire bundle clamp to the clip.

6 Claims, 2 Drawing Sheets

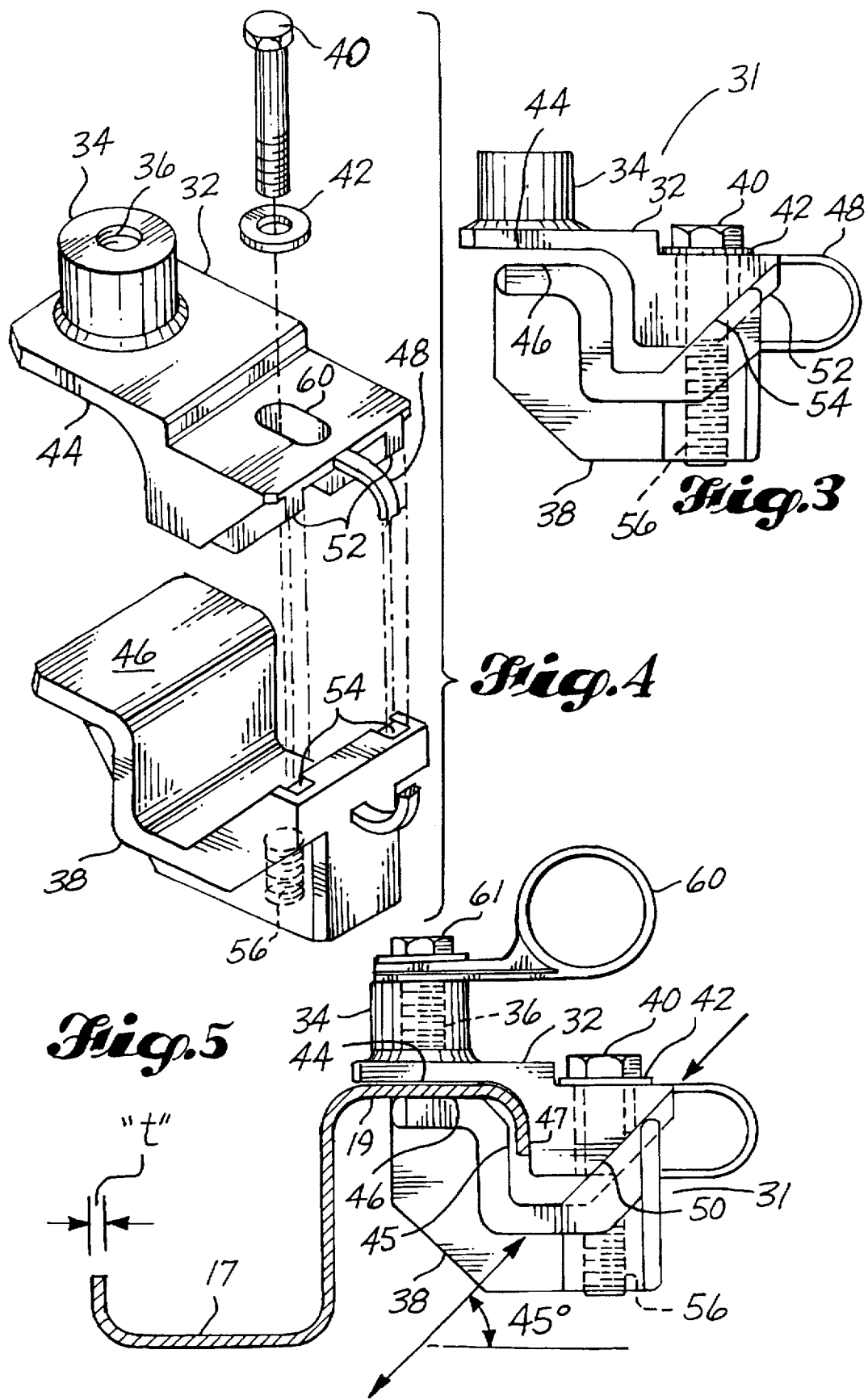

5,797,573

NON-PENETRATION CLIP ATTACHMENT

This application is a continuation of prior application Ser. No. 08/373,135, filed Jan. 12, 1995 now abandoned.

TECHNICAL FIELD

This invention relates generally to apparatus for attaching nonstructural elements to structural members and, more particularly, to clips for attaching wire bundles and the like to aircraft stringers.

BACKGROUND OF THE INVENTION

In the airplane manufacturing industry, the elongated and very long structural members that are attached to the fuselage skins and wing skins are known as stringers. Such stringers are often rolled from sheets of aluminum, of various thicknesses and dimensions, into cross-sections such as hat sections and Z or S sections.

Because stringers extend longitudinally along the fuselage and outwardly along the wing, it is convenient to attach to them hundreds of clips that hold and carry non structural elements such as wire bundles, hydraulic lines, air conditioning conduits, water lines, and the like to various parts of the airplane. At one time, it was not an uncommon practice to drill holes through, and penetrate, the stringer flanges in order to attach clips. However, this practice has been largely discontinued because the penetration caused removal of protective coatings, increased stresses, and stress corrosion around the holes.

U.S. Pat. No. 2,346,200 by Tinnerman discloses a fastening device for a stringer wherein the fastener has two legs which engage opposite sides of a stringer near one of its ends.

U.S. Pat. No. 2,329,894 by Hall discloses a wiring fastener which extends around one end of an S-shaped member.

U.S. Pat. No. 5,352,078 by Nasu which has the same inventor and assignee as this patent application, discloses in a fourth embodiment, a clip that is suitable for use with extruded Z section stringers. The other three embodiments of the '078 patent are concerned with clips for a rolled flange stringer.

Rolled flange stringers present difficulties in clip design. This is primarily due to the fact that such rolled sections normally include small upstanding auxiliary flanges on the outside portions of each major flange for column stiffness purposes. These small auxiliary flanges restrict the designer's freedom in locating attachment elements, particularly when an attempt is made to create a clip that will accommodate a wide variety of sheet thicknesses that are used for rolled stiffeners.

Because of the large numbers of clips used in an airplane, it is important that the clips be easy to install. It is also important that once the clips are installed properly, they will remain in place even when subjected to the severe vibrational and other forces which an airplane experiences.

Accordingly, it is a primary object of this invention to create a stringer clip that may be quickly attached to stringers of varying thicknesses, and will remain in place when subjected to vibrational loading.

FIG. 1 shows a prior art stringer attachment clip 10 of a type that is presently in use on a large number of commercial passenger airplanes. As shown, an ovalized spring steel band 12 is utilized to grip an upper surface 14 and a lower surface 16 of a flange of a rolled stringer 17. A bolt 18 and washer 19 secure a wire bundle holder 20, and a standoff washer 22. The bolt 18 is in threaded engagement with a nut plate 24 that is mounted upon the steel band 12.

In this prior art embodiment, one threaded connection (bolt 18 and nut 24) serves to attach both the clip 10 to the stringer 17 and the wire bundle holder 20 to the clip 10. The bolt 18 must be loosened in order to install the wire bundle clamp 20 and the clip 10 and therefore, does not allow preinstallation of clips 10 in the aircraft without the clamps 20.

When the bolt is tightened, the wire bundle clamp 20 often will be rotated about bolt 18 into a position that is not in proper alignment perpendicular to the direction of the stringer 17. This necessitates having the installer loosen the bolt 18 and make a second attempt to get both the steel band 12 and the bundle holder 20 properly aligned with respect to the stringer 17.

It has also been noted that the outer surface 26 of the end portion of the stringer 17 will sometimes be scratched locally through its protective coating by the threads 28 of the bolt 18 as the clip 12 rotates slightly about the grip surfaces 14 and 16 as the bolt 18 tightens the steel band 12 on the stringer 17.

SUMMARY OF THE INVENTION

This stringer clip invention utilizes a sliding concept that enables a two part clip to nest perfectly with a conventional rolled flange stringer regardless of the stringer thickness. The slide action allows the clip to grip the stringer flange without being effected by the thickness of a conventional stringer. The clip is preferably molded from a polymer material having smooth surfaces and has a first threaded insert for attachment of the clip to the stringer and a second threaded insert for attaching the wire bundle or other item to the clip.

BRIEF DESCRIPTION OF THE DRAWINGS

FIG. 3 is a side view of the clip of this invention.

FIG. 4 is an exploded isometric view of a clip according to this invention.

FIG. 5 is a side view of the clip of this invention shown close to gripping engagement with a S shaped stringer.

DESCRIPTION OF THE PREFERRED EMBODIMENT

Figure 1:
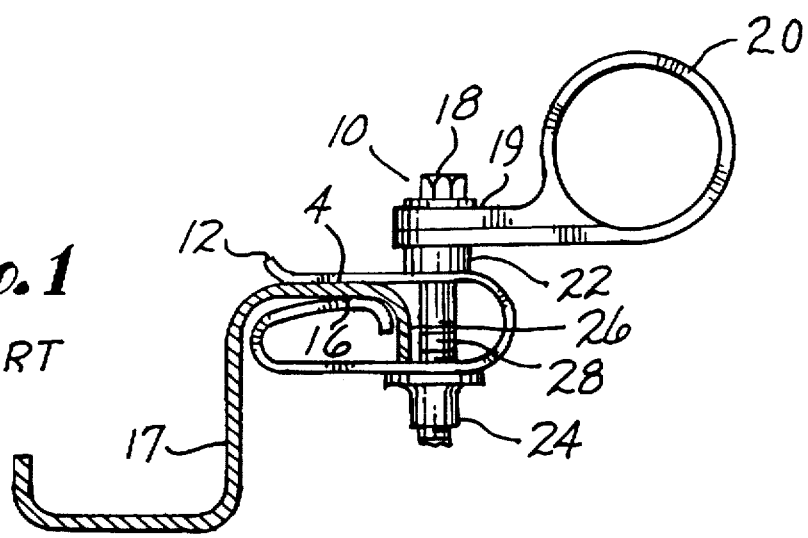
FIG. 1 is an elevation view of a prior art clip used on commercial aircraft.
Figure 2:
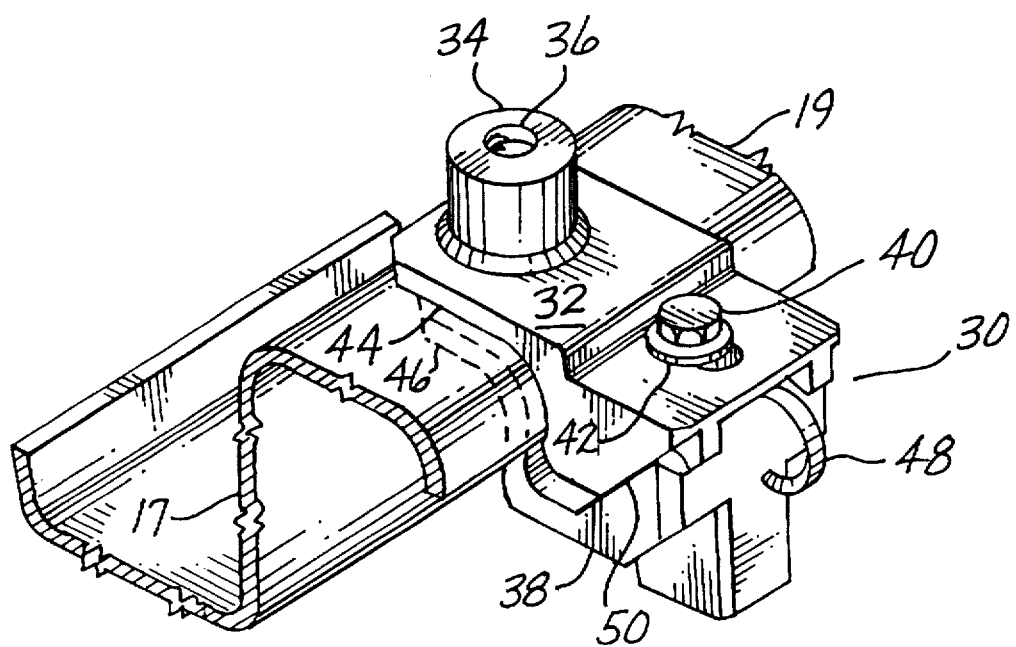
FIG. 2 is an elevation isometric view of a preferred embodiment of this stringer clip invention.

FIG. 2 shows a clip 30 that is presently a preferred embodiment of this invention. As shown, the clip 30 is attached to a rolled flange 19 of the stringer 17. The clip 30 includes two integrally molded parts, preferably molded of a polymer such as Delrin 500. As will become more apparent in the description that follows, the polymer should be moldable into smooth exterior surfaces, be stiff yet light in weight, and pockets should be appropriately located for shrinkage control. The top portion or first part 32 includes an upstanding boss 34 that contains a threaded metallic insert 36 that may either be molded into the first part or installed therein by an ultrasound or other technique. The upstanding boss 34, the metallic threaded insert 36, and a bolt are used to secure a clamp such as the wire bundle clamp 20 shown in FIG. 1. Referring back to FIG. 2, the boss 34 and the insert 36 provide a means for attaching, with a bolt, a wide variety of clamps for holding nonstructural elements such as wire bundles, hydraulic lines, air conditioning conduits, waterlines and the like.

The first part 32 and the bottom portion or second part 38 have matching 45° inclined surfaces 50 that slide against each other. The gripping surfaces 44 on the first part and 46 on the second part move toward each other and may be tightly clamped onto the flange 19 of the stringer 17 by tightening the bolt 40 42, as is best seen in FIGS. 3, 4 and 5. A third integrally molded part is a lanyard or strap 48 that is connected to each of the other two parts to keep them from becoming separated in the installation process. By integrally molding these three parts, inventory control of parts is simplified as is the process of installing the clip on the stringer.

FIG. 3 is a side elevation view of the clip 31 of this invention. The gripping surfaces 44 and 46 are positioned to apply clamping forces onto the flange 19 of a rolled flange stringer (not shown), as the connecting means or bolt 40 is tightened and the bottom portion or second part 38 slides upwardly on surface 54. The bolt 40 is tightly engaged in the threads of the insert 56 of the second part 38 and loosely engaged in a slotted hole 60 (see FIG. 4) of the first part 32 to allow for movement of the bolt 40 with the bottom portion or part 38.

To avoid undesired sideways or rotary motion, the clip 31 uses two lugs or rails 52 on the first part 32 that fit into two matching grooves 54 on the second part 38. These elements nest together such that when the bolt 40 is tightened in the threaded insert 56, the second part 38 moves upwardly in a 45° direction to draw the gripping surfaces 44 and 46 together.

In other words, the first part 32 and the second part 38 have matching 45° sliding surfaces that slide along each other as the connecting means or bolt 40 is tightened or loosened. The rails 52 and the grooves 54 prevent undesired sideways motion of the first and second parts 32 and 38.

FIG. 4 is an exploded isometric view of the clip of this invention. A slotted hole 60 and a threaded insert 56 are provided. The slotted hole 60 is necessary to allow relative motion between the first part 32 and the second part 38 in the direction of the slot 60 as the bolt 40 is tightened or loosened.

FIG. 5 shows the clip 31 almost fully installed on the stringer flange 19. As the bolt 40 is tightened, the bottom portion or second part 38 moves upwardly along the 45° ramp surface.

The clip is shown to be providing the support for a wire bundle clamp 62 on the upstanding boss 34. A bolt 61 is engaged in the threads of the insert 36. In aircraft production, the clamp 62 may be permanently secured to the boss 34 by the bolt 61 either before or after the clamp is installed on the stringer. This cannot be done with the prior art clip 10 of FIG. 1 because it utilizes only one bolt 18 to perform the functions of securing the clip to the stringer and the clamp to the clip. As bolt 40 is tightened, the second part 38 travels up the incline 50, bringing the gripping surface 46 against the lower surface of the flange 19 of stringer 17. This upwardly inclined movement will result in substantial gripping forces being imposed on surfaces 44 and 46. Also, further tightening of bolt 40 may result in a vertical gripping action between surfaces 47 and 45 of the first and second parts.

It will readily be recognized by persons skilled in this art that the stringer clip of this invention is quick and easy to install and tighten. This stringer clip provides means for securely attaching the clip to stringers. The clip will accommodate installation on rolled flange stringers of most thicknesses presently being used in commercial aircraft.

What is claimed is:

1. Clip apparatus for attaching an element to a flange comprising:

a first part having a first smooth and straight inclined surface a first gripping surface;

a second part having a second smooth and straight inclined surface a second gripping surface;

connection means for connecting said first part with said second part such that said first inclined surface contacts said second inclined surface and said first gripping surface contacts said flange on a first side of said flange and said second gripping surface contacts said flange on the opposite side of said flange;

and wherein an upstanding boss provides support for a clamp element.

2. The apparatus of claim 1 wherein said first and second inclined surfaces are inclined at an angle of approximately 45° with respect to the gripping surfaces of said clip.

3. The apparatus of claim 1 wherein said connecting means comprise a threaded fastener arranged such that tightening of said fastener will result in relative movement of said first part with respect to said second part on said inclined surfaces such that said first and second gripping surfaces will contact and grip said flange on opposite sides of said flange.

4. The apparatus of claim 2 wherein said connecting means comprise a bolt installed in an oblong oversized hole, and a threaded insert.

5. The apparatus of claim 2 wherein said first inclined surface includes a rail and said second inclined surface includes a matching groove for guidance during relative movement of said first inclined surface with respect to said second inclined surface.

6. Clip apparatus for attaching an element to a flange comprising:

a first part having a first smooth and straight inclined surface and a first gripping surface;

a second part having a second smooth and straight inclined surface and a second gripping surface;

connecting means for connecting said first part with said second part such that said first inclined surface contacts said second inclined surface and said first gripping surface contacts said flange on a first side of said flange and said second gripping surface contacts said flange on the opposite side of said flange;

wherein said first and second inclined surfaces are inclined at an angle of approximately 45° with respect to said gripping surfaces of said clip;

wherein said connecting means comprise a bolt installed at approximately 45° to said inclined surfaces;

whereas said connecting means comprise a bolt installed in an oblong oversized hole and a threaded insert;

and wherein an upstanding boss provides support for a clamp element.

* * * * *